US010625309B2

(12) United States Patent
Dean et al.

(10) Patent No.: US 10,625,309 B2
(45) Date of Patent: Apr. 21, 2020

(54) ACOUSTIC PANEL CLEANING

(71) Applicant: The Boeing Company, Chicago, IL (US)

(72) Inventors: Thomas A. Dean, Maple Valley, WA (US); David Michael Dembeck, Puyallup, WA (US); Scot D. Fisher, Renton, WA (US); Ieisha C. Hinson, Bay Shore, NY (US); Valerie R. Predmore, Enumclaw, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/228,646

(22) Filed: Dec. 20, 2018

(65) Prior Publication Data
US 2019/0126327 A1 May 2, 2019

Related U.S. Application Data

(62) Division of application No. 15/462,554, filed on Mar. 17, 2017, now Pat. No. 10,173,248.

(51) Int. Cl.
B08B 3/12 (2006.01)
B64F 5/30 (2017.01)
B08B 9/00 (2006.01)
B08B 3/08 (2006.01)

(52) U.S. Cl.
CPC .............. B08B 3/12 (2013.01); B08B 3/08 (2013.01); B08B 9/00 (2013.01); B64F 5/30 (2017.01)

(58) Field of Classification Search
None
See application file for complete search history.

(56) References Cited

U.S. PATENT DOCUMENTS 2,528,049 A 10/1950 Gonda
2005/0236012 A1* 10/2005 Josefsson .............. A47L 11/34 134/1
2007/0134466 A1* 6/2007 Rajaram ................ B32B 3/12 428/116

(Continued)

FOREIGN PATENT DOCUMENTS

JP 2006-250912 * 9/2006

OTHER PUBLICATIONS

Machine translation of JP2006-250912 by Oshima et al., published Sep. 21, 2006.*

Primary Examiner — Mikhail Kornakov
Assistant Examiner — Ryan L. Coleman
(74) Attorney, Agent, or Firm — Kunzler Bean & Adamson

(57) ABSTRACT

Disclosed herein is a method. The method includes applying a fluid to a perforated upper layer. The perforated upper layer forms an exposed surface of a multi-layer structure. The method also includes allowing the fluid to pass through the perforated upper layer and contact a contaminant within a core layer of the multi-layer structure. The core layer is disposed beneath the perforated upper layer, opposite the expose surface, and is coupled to the perforated upper layer. The method also includes applying ultrasonic energy to the exposed surface of the multi-layer structure using an ultrasonic generator to loosen the contaminant into the fluid. The method also includes removing the fluid with the loosened contaminant from the multi-layer structure.

19 Claims, 6 Drawing Sheets

(56) References Cited

U.S. PATENT DOCUMENTS

| | | | | |
|---|---|---|---|---|
| 2014/0124004 A1* | 5/2014 | Rosenstein | ............ | A47L 9/2852 |
| | | | | 134/18 |
| 2016/0159028 A1* | 6/2016 | Oleske | .................... | B32B 5/022 |
| | | | | 428/116 |
| 2017/0355081 A1* | 12/2017 | Fisher | .................... | B25J 9/1697 |

* cited by examiner

ACOUSTIC PANEL CLEANING

FIELD

This disclosure relates generally to acoustic paneling, and more particularly to cleaning of acoustic paneling.

BACKGROUND

Many complex structures, such as aircraft, spacecraft, automobiles, and the like, are made with complex components. Some of these complex components have specific behaviors and characteristics which are desired for efficient and effective operation. However, complex structures may become contaminated in the field of operation. Contamination can cause degradation or other changes in the behavior and characteristics of these complex structures. Because the structures are complex, cleaning the structures can be difficult or inefficient.

SUMMARY

The subject matter of the present application has been developed in response to the present state of the art, and in particular, in response to the shortcomings of traditional component cleaning methods and systems, which have not yet been fully solved by currently available techniques. Accordingly, the subject matter of the present application has been developed to provide cleaning methods, and associated systems, that overcome at least some of the above-discussed shortcomings of prior-art techniques.

Disclosed herein is a method. The method includes applying a fluid to a perforated upper layer. The perforated upper layer forms an exposed surface of a multi-layer structure. The method also includes allowing the fluid to pass through the perforated upper layer and contact a contaminant within a core layer of the multi-layer structure. The core layer is disposed beneath the perforated upper layer, opposite the exposed surface, and is coupled to the perforated upper layer. The method also includes applying ultrasonic energy to the exposed surface of the multi-layer structure using an ultrasonic generator to loosen the contaminant into the fluid. The method also includes removing the fluid with the loosened contaminant from the multi-layer structure. The preceding subject matter of this paragraph characterizes example 1 of the present disclosure.

The multi-layer structure is an acoustic panel. The preceding subject matter of this paragraph characterizes example 2 of the present disclosure, wherein example 2 also includes the subject matter according to example 1, above.

The core layer includes cells defined by cell walls. The cell walls are oriented approximately perpendicular to the perforated upper layer. The preceding subject matter of this paragraph characterizes example 3 of the present disclosure, wherein example 3 also includes the subject matter of example 2, above.

The cells have a honeycomb geometry. The preceding subject matter of this paragraph characterizes example 4 of the present disclosure, wherein example 4 also includes the subject matter according to example 3, above.

The core layer includes an acoustic septum within the core layer and oriented approximately parallel to the perforated upper layer. The preceding subject matter of this paragraph characterizes example 5 of the present disclosure, wherein example 5 also includes the subject matter according example 2, above.

Applying the ultrasonic energy to the exposed surface of the multi-layer structure includes contacting a coupling horn of the ultrasonic generator to the exposed surface to transmit the ultrasonic energy through the exposed surface to the core layer and from the core layer to the fluid. The preceding subject matter of this paragraph characterizes example 6 of the present disclosure, wherein example 6 also includes the subject matter according to any one of examples 1-5, above.

The perforated upper layer comprises a plurality of apertures. The preceding subject matter of this paragraph characterizes example 7 of the present disclosure, wherein example 7 also includes the subject matter according to any one of examples 1-6, above.

The apertures have a diameter of approximately 1 millimeter or less. The preceding subject matter of this paragraph characterizes example 8 of the present disclosure, wherein example 8 also includes the subject matter according to example 7, above.

Removing the fluid with the loosened contaminant from the multi-layer structure includes applying at least one of compressed air or suction to the exposed surface. The preceding subject matter of this paragraph characterizes example 9 of the present disclosure, wherein example 9 also includes the subject matter according to any one of examples 1-8, above.

The fluid includes a solvent. The preceding subject matter of this paragraph characterizes example 10 of the present disclosure, wherein example 10 also includes the subject matter according to any one of examples 1-9, above.

The solvent comprises methyl n-propyl ketone. The preceding subject matter of this paragraph characterizes example 11 of the present disclosure, wherein example 11 also includes the subject matter according to example 10, above.

The solvent comprises methyl ethyl ketone. The preceding subject matter of this paragraph characterizes example 12 of the present disclosure, wherein example 12 also includes the subject matter according to example 10, above.

Also disclosed herein is a method of cleaning an acoustic panel installed on an aircraft. The method includes determining a target cleaning area on the acoustic panel through the detection of contamination in the acoustic panel. The method also includes applying a solvent to a perforated layer of the acoustic panel in the target cleaning area to penetrate through the perforated layer to a core layer of the acoustic panel below the perforated layer. The method also includes placing a coupling horn of an acoustic generator into contact with the perforated layer of the acoustic panel. The method also includes providing a power signal to the ultrasonic generator to generate ultrasonic energy within the cleaning frequency sufficient to induce cavitation in the solvent within the core layer of the acoustic panel. The method also includes loosening the contamination within the core layer of the acoustic panel by moving the coupling horn around the target cleaning area. The method also includes applying pressure differential to extract the solvent and the loosened contamination from the acoustic panel. The preceding subject matter of this paragraph characterizes example 13 of the present disclosure.

Loosening the contamination within the core layer of the acoustic panel includes loosening the contamination from at least one of a cell wall and an acoustic septum within the core layer of the acoustic panel. The preceding subject matter of this paragraph characterizes example 14 of the present disclosure, wherein example 14 also includes the subject matter according to example 13, above.

Determining the target cleaning area on the acoustic panel includes performing acoustic impedance testing on the acoustic panel. The preceding subject matter of this paragraph characterizes example 15 of the present disclosure, wherein example 15 also includes the subject matter according to any one of examples 13-14, above.

Further testing the target leaning area of the acoustic panel after extracting the solvent and determining whether the contamination in the target cleaning area has been reduced to an acceptable threshold based on the testing of the target cleaning area of the acoustic panel. The preceding subject matter of this paragraph characterizes example 16 of the present disclosure, wherein example 16 also includes the subject matter according to any one of examples 13-15, above.

Also disclosed is a system. The system includes a solvent supply, an ultrasonic generator, a coupling horn, and a solvent removal device. The solvent supply is configured to apply a solvent to a target cleaning area of an acoustic panel. The ultrasonic generator is configured to generate ultrasonic energy at a cavitation frequency of the solvent. The coupling horn is coupled to the ultrasonic generator. The coupling horn is configured to contact the target cleaning area of the acoustic panel and to move across the acoustic panel though the target cleaning area. The solvent removal device is configured to remove solvent from the acoustic panel. The preceding subject matter of this paragraph characterizes example 17 of the present disclosure.

A control module configured to control at least one of the solvent supply, the ultrasonic generator, movement of the contract horn, and the solvent removal device. The preceding subject matter of this paragraph characterizes example 18 of the present disclosure, wherein example 18 also includes the subject matter according to example 17, above.

The control module includes a targeting module configured to identify the target cleaning area of the acoustic panel. The preceding subject matter of this paragraph characterizes example 19 of the present disclosure, wherein example 19 also includes the subject matter according to any one of examples 17-18, above.

The targeting module configured to identify the target cleaning area using and acoustic impedance test to identify contaminated regions of the acoustic panel. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Embodiments described below relate to cleaning a multi-layer structure. Complex components can be difficult to clean once contamination has built up on them. Panels or components with internal spaces and internal layers (e.g., locations that are difficult to reach) are particularly vulnerable. Some multi-layer structures can be employed to control noise generated by vehicles and machinery, such as aircraft and engines, during operation. Other multi-layer structures control vibration or provide other functionality. Contamination built up within the multi-layer structure can disrupt the function of the multi-layer structure. For example, multi-layer structures designed to reduce noise or sound at a given frequency may end up increasing noise or reducing a different frequency of sound when contamination is present.

A cleaning method is described below which introduces a solvent to the contaminated portion of the multi-layer structure and applies an ultrasonic generator to a first portion of the multi-layer structure to provide a cleaning action at the contaminated portion of the multi-layer structure, which is spaced away from the application site of the ultrasonic generator. The contaminated portion of the multi-layer structure may be identified using acoustic impedance testing. Acoustic impedance testing can also be used to assess the effectiveness of the cleaning process and identify areas for another cleaning pass or for application of a different solvent. The solvent can then be removed through flushing, vacuuming, application of compressed air, or other processes. Other embodiments and example are described below with respect to the several Figures.

Figure 1A:
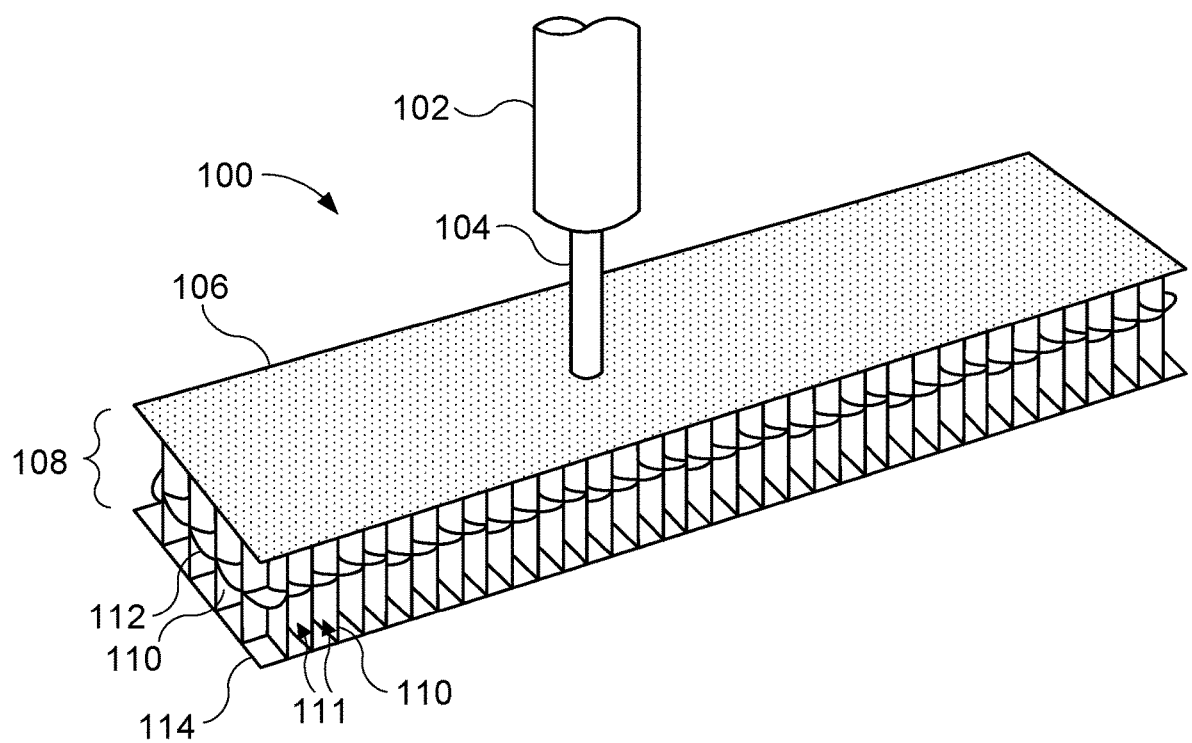
FIG. 1A is a schematic cutaway view of a multi-layer structure and an ultrasonic generator applied to the multi-layer structure, according to one or more examples of the present disclosure.

The illustrated embodiment of FIG. 1A is a schematic cutaway view of a multi-layer structure 100 with an ultrasonic generator 102 engaged with the multi-layer structure 100. In the illustrated embodiment, a coupling horn 104 of the ultrasonic generator 102 is applied to an upper layer 106 of the multi-layer structure 100. The ultrasonic generator 102 is a device capable of generating an electrical signal which causes vibrations in the ultrasonic range at the coupling horn 104. Various power levels and other tuning can be applied by the ultrasonic generator to emit ultrasonic energy which can create cavitation in a solvent and vibration of components of the multi-layer structure 100 as will be described in more detail below.

In some embodiments, the multi-layer structure 100 is an acoustic panel. The upper layer 106 of the multi-layer structure 100 is perforated to allow pressure waves associated with sound to pass through to a core layer 108 of the multi-layer structure 100. The upper layer 106 is coupled to the core layer 108. In the illustrated embodiment, the core layer 108 includes cell walls 110, which divide the core layer 108 into individual cells 111. The cells 111 may have any of various shapes, such as a honeycomb, a cylinder, a cuboid, or other geometry. The cells may be uniformly sized and/or shaped throughout the core layer 108 or variably sized and/or shaped. A mesh, screen, fabric, or other flexible or non-flexible material or structure is positioned within some or all of the cells 111 to function as a septum 112. In one embodiment, the septum 112 is made from a flexible material, such as rubber, and acts to dampen acoustic vibrations for the purpose of reducing noise. In some embodiments, the septum 112 is simply a hard interlayer or panel.

The multi-layer structure 100 also includes a lower layer 114. The lower layer 114 provides closure of the cells of the core layer 108. The lower layer 114 may also further tune or affect the acoustic or other characteristics of the multi-layer structure 100. In one example, the combination of the components of the multi-layer structure 100 forms an acoustically active structure. In this example, the multi-layer structure 100 effectively operates as a Helmholtz-type resonator to reduce a range of frequencies from a source of sound. The damping effect may be produced by amplifying sound having a frequency tuned to cancel out a range of frequencies which are problematic or unwanted.

During installation, operation, or servicing, etc., the multi-layer structure 100 may become contaminated. Potential contaminants include dust and dirt particles, exhaust deposits, paints, deicers, surface treatments, washes, and other materials and material decompositions. As contamination builds on the multi-layer structure 100, the acoustical properties and behaviors are affected and may reduce the effectiveness of the multi-layer structure 100.

Because the upper layer 106 is a perforated sheet (also referred to as a resistive sheet, face sheet, or skin), contaminants are able to enter into the cells 111 of the core layer 108. Even though, in some embodiments, the perforations in the upper layer 106 are relatively small, smaller particulates may still enter. For example, the perforations may be about 1 mm in diameter. In other embodiments, the perforations are larger or smaller than 1 mm. In some embodiments, the perforations in the upper layer 106 provide direct access to approximately 8% of the cells 111 formed in the core layer 108. Other embodiments may include lesser or greater exposure of the cells 111 through the perforations. The diameter and alignment of the perforations on the upper layer 106 relative to the cells 111 may not allow or may reduce the effectiveness of efforts or systems to remove the contamination from the core layer 108. Therefore, direct access to clean the cells 111, including the septum 112, in the core layer 108 is limited.

In the embodiments described herein, a fluid, such as a solvent, is applied to the upper layer 106, allowed to pass through the perforations, and enter the core layer 108. The solvent coats the walls of the cells 111 and the septum 112. The solvent can be any of various solvents or cleaning solutions known in the art. In one implementation, the solvent is a methyl n-propyl ketone (MPK) solvent. In another implementation, the solvent is a methyl ethyl ketone (MEK) solvent.

An ultrasonic energy is applied by the ultrasonic generator 102 via the coupling horn 104. The coupling horn 104 is applied to the surface of the upper layer 106 to communicate the ultrasonic energy generated by the ultrasonic generator 102 into the multi-layer structure 100. The ultrasonic energy is transmitted from the coupling horn 104 into the upper layer 106 or fluid on the surface of the upper layer 106. From the upper layer 106, the ultrasonic energy passes into the core layer 108 and thus the cells 111 of the core layer 108.

The ultrasonic energy impacts contaminants within the cells 111 and loosens the contaminants into the fluid which may then be flushed, vacuumed, or otherwise removed from the multi-layer structure 100. The process and effect of applying the ultrasonic energy in the presence of the fluid is described in more detail below.

Figure 1B:
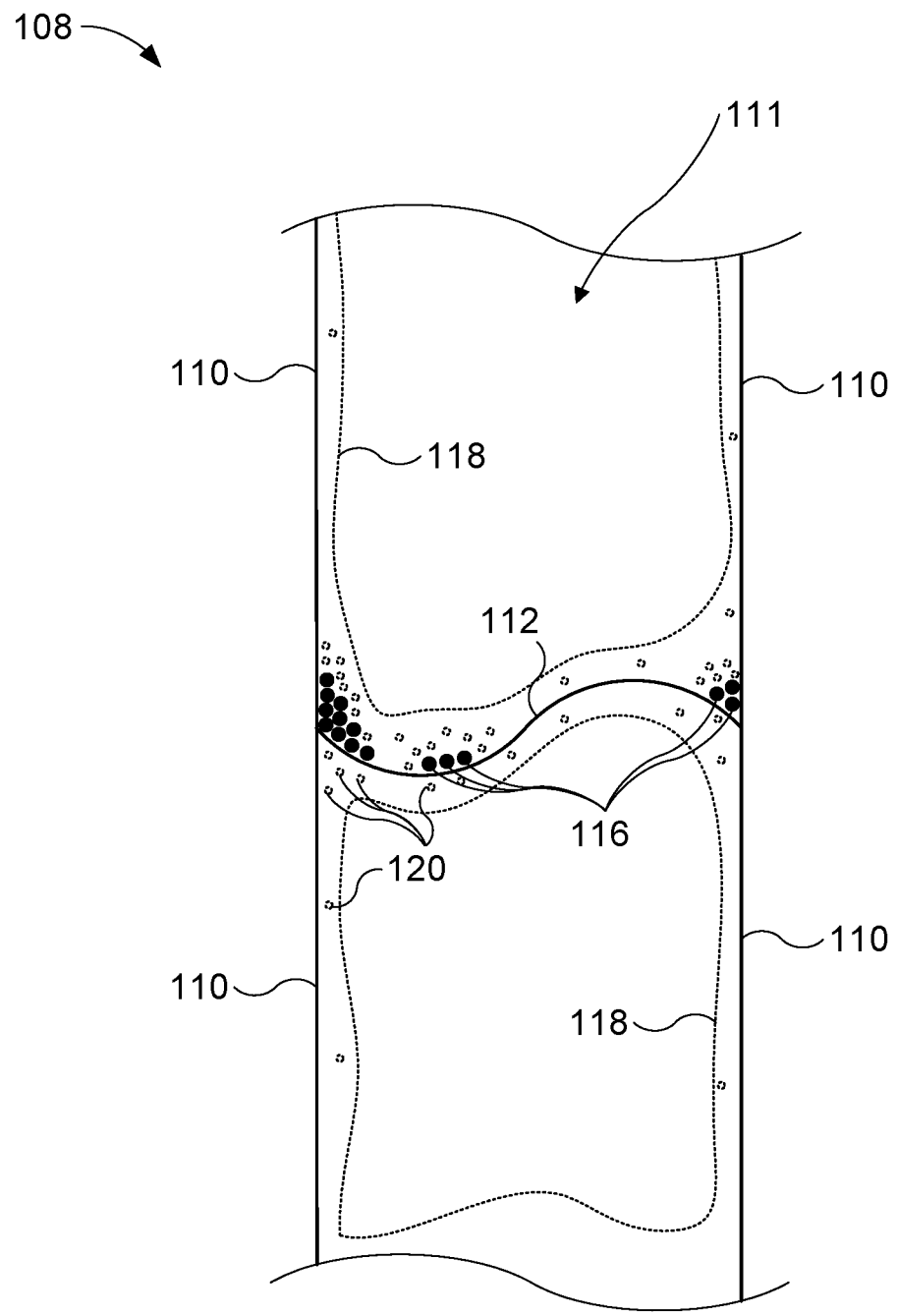
FIG. 1B is a cross-sectional view of a core layer of a multi-layer structure, according to one or more examples of the present disclosure.

FIG. 1B is a cross-sectional view of a core layer 108, according to one or more examples of the present disclosure. The illustrated embodiment of the core layer 108 includes opposing cell walls 110, which define the cell 111, and a septum 112 positioned within the cell 111 to effectively separate (e.g., bifurcate) the cell 111 into two portions. The septum 112 extends transversely across the cell 111 from one cell wall 110 to the other cell wall 110. In the illustrate embodiment, the core layer 108 has developed deposits of a contaminant 116. A fluid 118 is also shown which has been introduced into the core layer 108, through one or more perforations, for the purpose of removing the contaminant 116 as described above.

Application of ultrasonic energy to the upper layer, as shown in FIG. 1A, transmits the energy to the cell walls 110 and the septum 112. In turn, the ultrasonic energy is transmitted to the fluid 118. The fluid 118 responds to the ultrasonic energy by forming cavitation zones 120. The cavitation zones 120 are voids or bubbles of partial vacuum formed in the fluid 118 by compression forces applied to the fluid 118 by ultrasonic waves communicated through the cell walls 110, the fluid 118, and the septum 112. The size of the cavitation zones 120 is a function of the frequency of the ultrasonic energy applied. The cavitation zones 120 collapse as the compression forces of the ultrasonic energy pass through the fluid 118. The collapse of the various cavitation zones 120 releases relatively high bursts of energy, in the form of force and temperature, which are effective in loosening the contaminant 116 into the fluid for removal.

The application of ultrasonic energy to the multi-layer structure 100 and the fluid 118 removes the need for the use of harsher chemicals/solvents which may be more expensive, dangerous to the user, damaging to nearby structures, or more environmentally destructive. Additionally, this approach allows for the cleaning process to be carried out in situ without the need to remove the multi-layer structure from an installation such as an engine barrel, a translating sleeve, a thrust reverser, an auxiliary power unit intake, an exhaust port, an inlet duct, a drain hole, or other portion of an assembly or complex structure.

Figure 2:
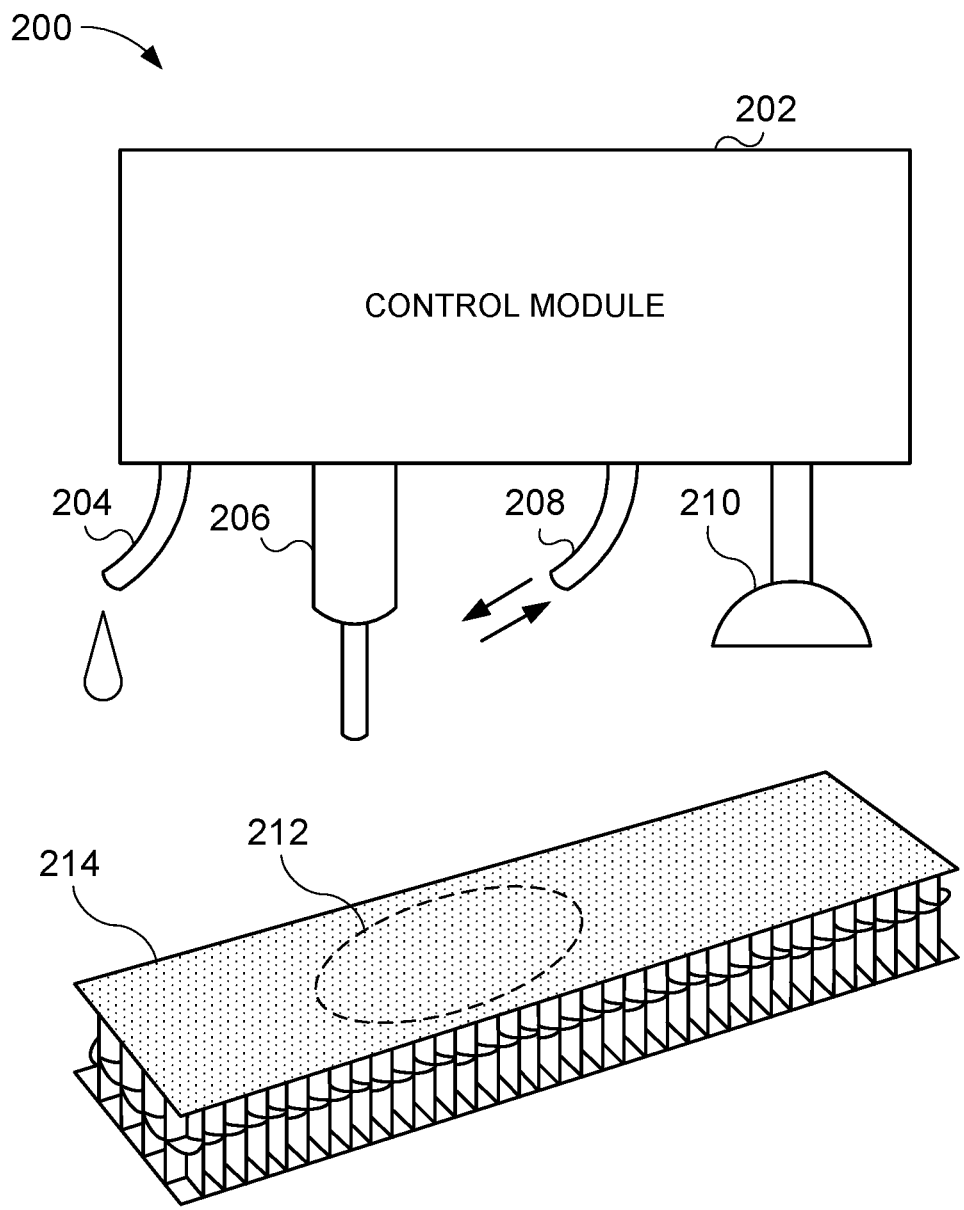
FIG. 2 is a schematic view of a cleaning system positioned relative to a multi-layer structure, according to one or more examples of the present disclosure.

FIG. 2 is a schematic view of a cleaning system 200 according to one or more examples of the present disclosure. The illustrated embodiment of the cleaning system 200 includes a control module 202. The control module 202 is coupled to a solvent supply 204, an ultrasonic generator 206, a solvent removal device 208, and a targeting module 210. In the illustrated embodiment, the solvent supply 204 applies a solvent to a target cleaning area 212 on an acoustic panel 214. The solvent supply 204 may apply the solvent in a relatively lower-pressure flooding action or a relatively higher-pressure spraying or misting action. In some embodiments, the control module 202 provides a control signal to start and stop the application of solvent to a target cleaning area 212 of the acoustic panel 214. The control module 202 may also control a flow rate or pressure of the solvent.

In some embodiments, the ultrasonic generator 206 is similar to the ultrasonic generator 102 described above with reference to FIG. 1A. The control module 202 controls one or more of a position, activation, and power level of the ultrasonic generator 206. In one example, the control module 202 positions the ultrasonic generator 206 in contact with the acoustic panel 214 at the target cleaning area 212. The target cleaning area 212 may be the size of the coupling horn of the ultrasonic generator 206, a few square inches, or larger.

The control module 202 activates the ultrasonic generator 206 to begin generating ultrasonic energy and communicating that energy into the acoustic panel 214 at the target cleaning area 212. The control module 202 may adjust the power level of the ultrasonic generator 206, to produce ultrasonic energy at a frequency tuned to clean the acoustic panel 214 based on the acoustic properties of the panel 214, the solvent applied by the solvent supply 204, contamination to be removed, or another parameter or a combination of these parameters. In one implementation, the ultrasonic energy generated by the ultrasonic generator 206 is applied to the acoustic panel 214 to help the solvent to penetrate into the acoustic panel 214. In yet one implementation, the ultrasonic generator 206 is applied to the acoustic panel 214 after the solvent is penetrated into the acoustic panel 214 to facilitate cleaning and extraction of the solvent and contamination.

The control module 202 is coupled to the solvent removal device 208. The control module 202 controls the application of a pressure differential (i.e. compressed air or suction), a rinse material such as clean solvent, a drying agent, and/or other fluid to remove the solvent provided by the solvent supply 204. In some embodiments, the solvent removal device 208 is unified with the solvent supply 204 to perform both solvent supply and removal in a single component. In some embodiments, the solvent may be applied by the solvent supply 204 during operation of the ultrasonic generator 206 to clean the acoustic panel 214 and while the solvent removal device 208 removes used and extra solvent from the acoustic panel 214 to prevent overflow or contamination or damage of other components.

In the illustrated embodiment, the control module 202 also operates the targeting module 210. The targeting module 210 includes one or more sensors to determine the target cleaning area 212 on the acoustic panel 214. The targeting module 210 includes acoustic sensors, optical sensors, electrical sensors, or other sensors or scanning components to locate and measure contamination within the acoustic panel 214. If contamination is determined to be above an acceptable threshold, the control module 202 designates the location as the target cleaning area 212 or a portion of the target cleaning area 212.

The targeting module 210 may also be used after a cleaning cycle has been performed on the target cleaning area 212 to determine the effectiveness of the completed cleaning cycle. For example, if the contamination is still outside of an acceptable threshold, the control module 202 re-designates the contaminated area as part of a new target cleaning area 212. The threshold may be based on a percentage of the optimum acoustic characteristics of the acoustic panel, an optical inspection of the acoustic panel, a penetrating scan of the acoustic panel, an analysis of the solvent removed from the acoustic panel, or other criteria.

In some embodiments, the control module 202 selects a different solvent for application to the target cleaning area 212 if the target cleaning area 212 includes a portion of the acoustic panel 214 that was cleaned in one or more previous cleaning cycles and has not met the acceptable threshold. In one example the first cleaning pass applies and removes a methyl n-propyl ketone (MPK) solvent to clean the acoustic panel 214 and the second pass applies and removes methyl ethyl ketone (MEK) solvent to clean the acoustic panel 214.

In some embodiments, the targeting module 210 is moved by the control module 202 to be over the acoustic panel 214 for identifying the target cleaning area 212. In other embodiments, the targeting module 210 is fixed and is activated to scan the acoustic panel 214 from the fixed position. The targeting module 210 may be activated before the cleaning process, after the process, and/or during the process.

In some embodiments, the operation of the various components described above are machine controlled. For example, the control module 202 can form part of a robot operable to move the components relative to the part to be cleaned. In other embodiments, some or all of the various components described above are manually controlled. Various combinations of automated and manual systems are also contemplated.

Figure 3:
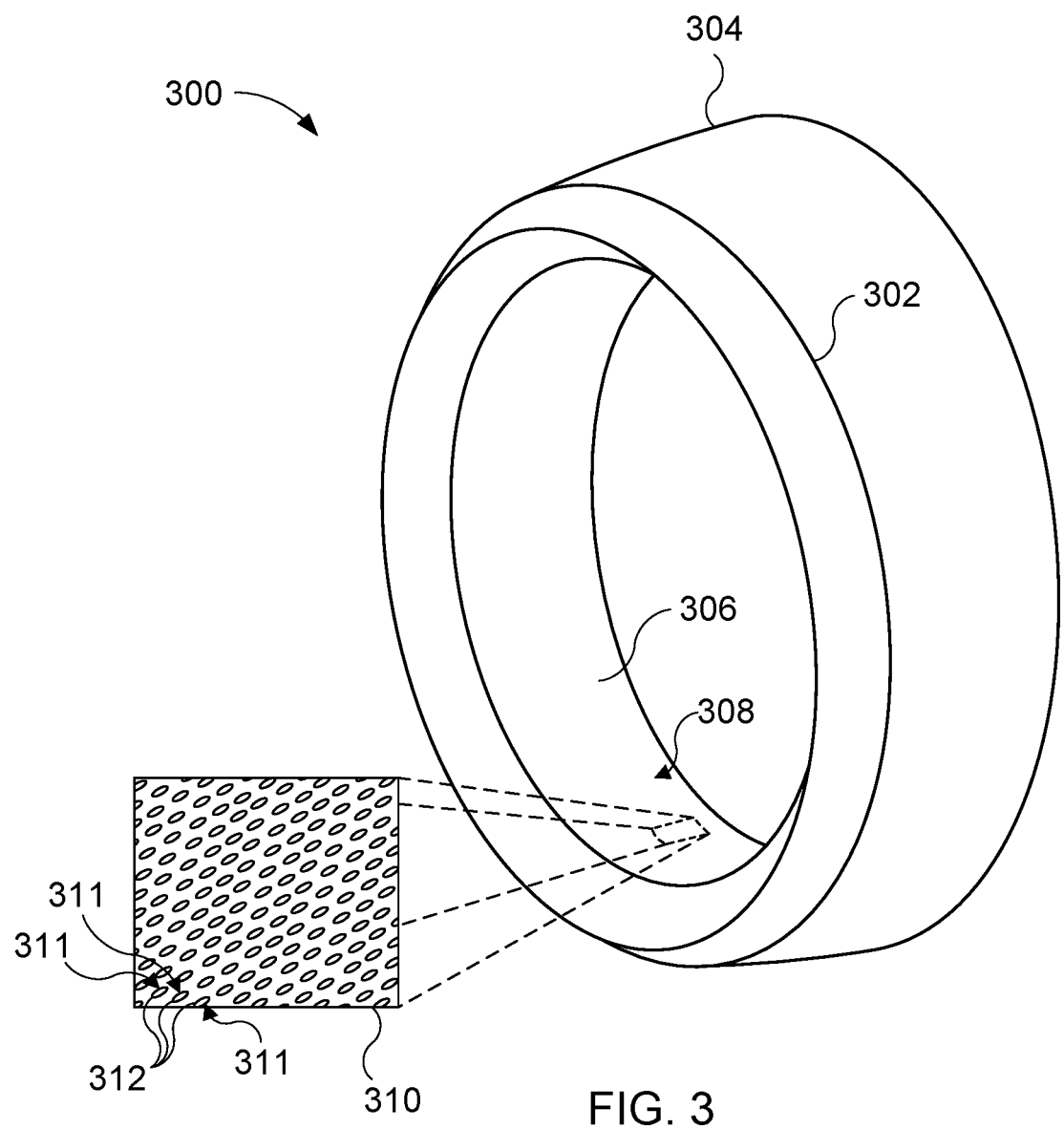
FIG. 3 is a schematic view of an inlet of a jet engine, according to one or more examples of the present disclosure.

FIG. 3 is a schematic view of an inlet 300 of a jet engine, according to one or more examples of the present disclosure. The illustrated embodiment of the inlet 300 includes an inlet lip 302, an outer cowling 304, and an inner barrel 306. The inlet lip 302 is an unperforated ring of aluminum or other material. The inlet lip 302 directs a relatively smooth stream of air into a jet engine. The outer cowling 304 provides a smooth skin to allow air passing over the outside of the inlet 300 to do so with minimal resistance and disturbance to the flow. Additionally, the outer cowling 304 may provide access to portions or components of the jet engine or other systems, or provide other functionality. The inner barrel 306 provides a surface which facilitates smooth or laminar flow of the air into and through the interior of the inlet 300.

At least a portion of the inner barrel 306 includes multi-layer resonator structures 311 to reduce the noise generated at the fan and further along in the jet engine. In the illustrated embodiment, the inner barrel 306 includes a perforated portion 308, which forms part of the multi-layer resonator structures 311 and a portion of which is shown in more detail in the magnified view. The perforated portion 308 of the inner barrel 306 includes perforations 312, which allow the sounds waves, generated in part by operation of the jet engine, to pass through the surface of the inner barrel 306 and into the multi-layer resonator structures 311. While the perforations 312 are shown as round or ovular perforations, the perforation 312 may also have other geometries as presented above. Additionally, the perforated portion 308 is shown with a certain concentration or density of perforations 312. However, various implementations may include various concentrations of the perforations 312 over a given area of the perforated portion 308. For example, the perforations 312 may be arranged in a pattern or arranged randomly across the inner barrel 306.

The sound waves that pass through the perforated portion 308 interact with a core layer (e.g., the core layer 108 of FIG. 1) of the multi-layer resonator structures 311. The effect of the multi-layer resonator structures 311 in the inner barrel 306 is to reduce the amount of sound transmitted from the engine to the environment through damping and/or noise cancelation.

While the illustrated embodiment describes an inner barrel of a jet engine inlet, it is contemplated that a multi-layer resonator structures 311 may be applied to a wide range of parts and locations on a system or assembly to produce different effects on acoustic energy received at the multi-layer structure.

Figure 4:
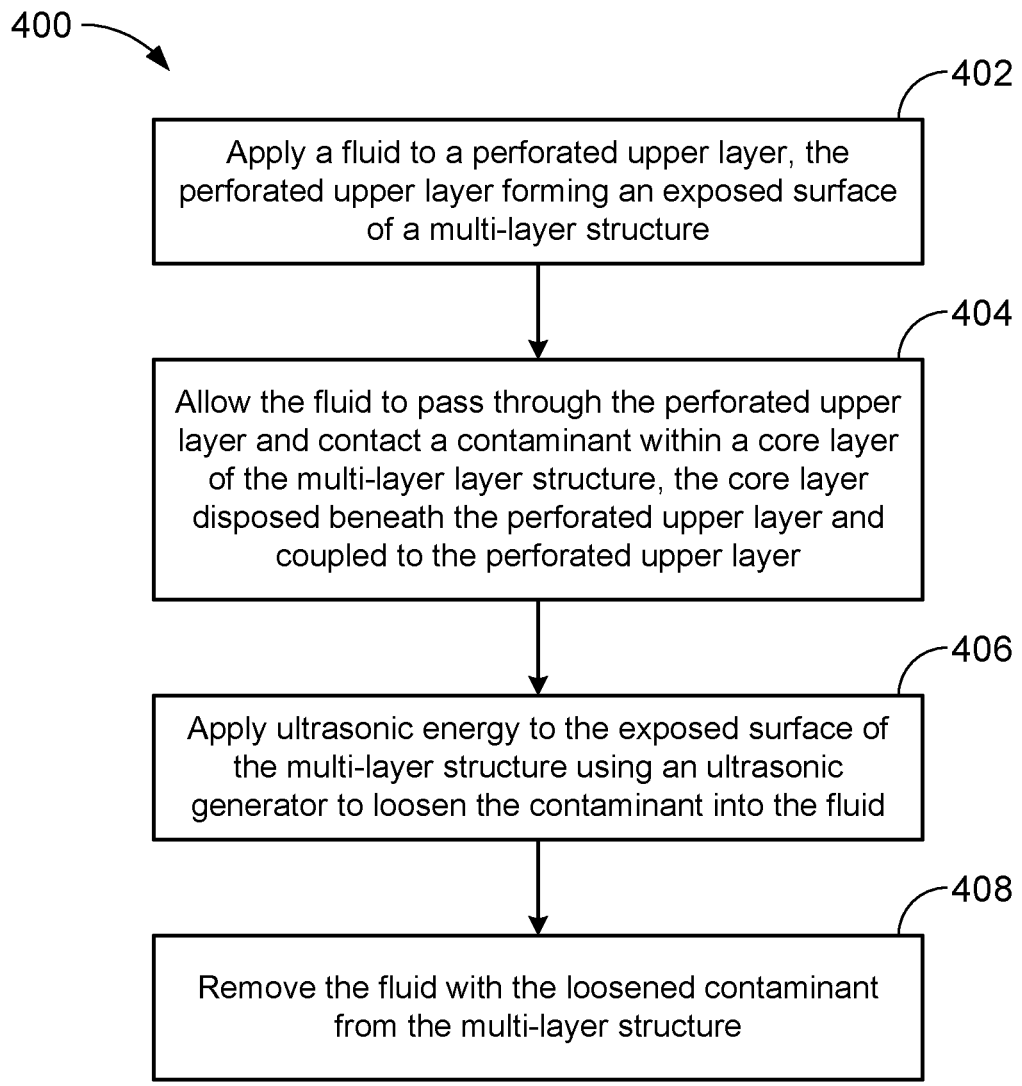
FIG. 4 is a flow diagram of a method of cleaning a core layer of a multi-layer structure, according to one or more examples of the present disclosure.

FIG. 4 is a flow diagram of a method 400 of cleaning a part, according to one or more examples of the present disclosure. In the illustrated embodiment, at block 402, the method 400 includes applying a fluid to a perforated upper layer. The perforated upper layer forms an exposed surface of a multi-layer structure. The perforated upper layer may include round perforations or perforations of another geometry. The fluid is a solvent or other material to remove contamination from the multi-layer structure.

At block 404, the method 400 includes allowing the fluid to pass through the perforated upper layer and contact a contaminant within a core layer of the multi-layer structure. The core layer is disposed beneath the perforated upper layer and is coupled to the perforated upper layer. Allowing the fluid to pass through the perforated upper layer includes waiting an amount of time for gravity, suction, or capillary action to pull the fluid into the core layer, applying a pressure differential across the perforated upper layer, or otherwise stimulating the passage of the fluid through the perforated upper layer. Once fluid passes through the perforated upper layer, it enters the core layer. The core layer may contain contaminants that have passed through the perforated upper layer or were otherwise introduced to the core layer (such as during manufacturing of the multi-layer structure).

The core layer is coupled to the perforated upper layer through chemical or thermal bonding, adhesion, or other coupling mechanics. In some embodiments, the perforated upper layer and the core layer are made of similar or different materials. For example, the perforated upper layer is a metal such as aluminum while the core layer is a polymer or composite material. The core layer may also include a septum disposed within the core layer. Other layers or components may also be included in the core layer.

At block 406, the method 400 includes applying ultrasonic energy to the exposed surface of the multi-layer structure using an ultrasonic generator to loosen the contaminant into the fluid. The ultrasonic energy is passed from the exposed surface of the multi-layer structure into the fluid and/or the core layer. The ultrasonic energy creates cavitation voids in the fluid which collapse and impart a relatively large amount of energy into the contamination to loosen it from the core layer into the fluid. The frequency of the ultrasonic energy is tuned to at least one of the fluid, contaminant, and the multi-layer structure. For example, the frequency of the ultrasonic energy may be selected based on the viscosity of the fluid or resonant frequency of a component of the multi-layer structure.

At block 408, the method 400 includes removing the fluid with the loosened contaminant from the multi-layer structure. The fluid is removed by blowing compressed air over the exposed surface, applying suction to the exposed surface, or rinsing the exposed surface with clean solvent, a rinse agent, or a drying agent. Other processes for extracting the solvent may be applied.

Figure 5:
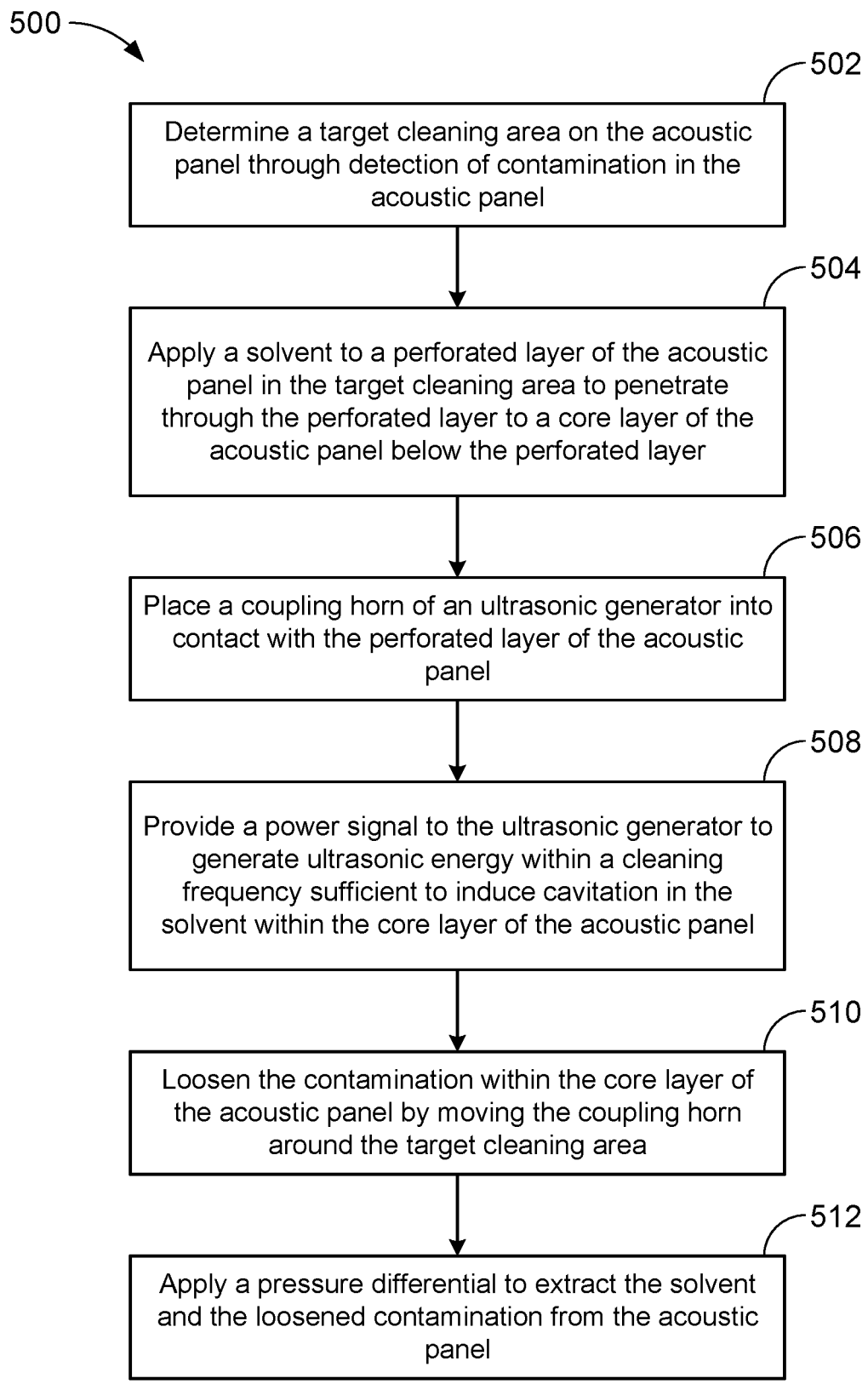
FIG. 5 is a flow diagram of a method of cleaning an acoustic panel installed on an aircraft, according to one or more examples of the present disclosure.

FIG. 5 is a flow diagram of a method 500 of cleaning an acoustic panel installed on an aircraft, according to one or more examples of the present disclosure. At block 502, the method 500 includes determining a target cleaning area on the acoustic panel through the detection of contamination in the acoustic panel. The contamination is identified through inspection. In one embodiment, the inspection is an acoustic impedance test performed on the acoustic panel. Inspection may also be accomplished through a fiberscope or other optical inspection systems. Other inspection procedures may also be implemented.

At block 504, the method 500 includes applying a solvent to a perforated layer of the acoustic panel in the target cleaning area to penetrate through the perforated layer to a core layer of the acoustic panel below the perforated layer. The solvent is applied in a flood using relatively little pressure or through the application of pressure in a spray or misting process. Application of the solvent may include the use of barriers or containers to restrict the flow of solvent over the acoustic panel to avoid contamination of other components of the aircraft or maintain a volume of the solvent within the target cleaning area.

At block 506, the method 500 includes placing a coupling horn of an ultrasonic generator into contact with the perforated layer of the acoustic panel. The coupling horn is placed in contact with the perforated layer by a user or by the actuation of a drive system such as a robotic arm or other mechanically and/or electrically controlled drive system. Contact with the perforated layer is established through direct contact to the perforated layer or through contacting the solvent on the surface of the perforated layer.

At block 508, the method 500 includes providing a power signal to the ultrasonic generator to generate ultrasonic energy within a cleaning frequency sufficient to induce cavitation in the solvent within the core layer of the acoustic panel. Cavitation may also occur in solvent left the exposed surface of the acoustic panel. This may be useful to remove surface contamination that has not entered into the core layer.

Additionally, the ultrasonic energy may cause vibration of the components of the acoustic panel. The cleaning frequency may be selected based on the properties of the solvent, the acoustic panel, the contamination, or other variables, or a combination of these. The cleaning frequency is held steady for a duration of a cleaning process or is varied according to a pre-determined schedule or pattern or in response to a detected parameter associated with the acoustic panel.

At block 510, the method 500 includes loosening the contamination within the core layer of the acoustic panel by moving the coupling horn around the target cleaning area.

The movement of the coupling horn around the target area is controlled by a user or a mechanical, electrical, or computer-driven system. In some embodiments, the coupling horn has a dwell time of between approximately 1 second to approximately 3 seconds. Other time frames or movement patterns may be implemented. In some embodiments, the movement of the coupling horn within the target cleaning area is determined by a simultaneous scan or inspection of the acoustic panel at the target cleaning area.

At block 512, the method 500 includes applying a pressure differential to extract the solvent and the loosened contamination from the acoustic panel. The pressure differential is achieved through application of a pressurized fluid, such as air, solvent, a rinse material, or other agent. Alternatively, the pressure differential is achieved through the application of suction. The removal of the fluid may also perform a separate function such as reconditioning, lubricating, drying, or sealing one or more components of the acoustic panel.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enables the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flowchart included herein are generally set forth as logical flowchart. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flowchart, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system comprising:
   a curved acoustic panel comprising a multi-layer structure that is acoustically active, wherein the acoustic panel comprises a curved upper layer that is perforated;
   a solvent supply configured to supply solvent to a target cleaning area of the acoustic panel, wherein the solvent supply is configured to deliver the solvent through the perforated upper layer of the acoustic panel;
   an ultrasonic generator configured to generate ultrasonic energy at a cavitation frequency of the solvent;
   a coupling horn coupled to the ultrasonic generator, the coupling horn configured to contact the target cleaning area of the acoustic panel, cavitate solvent within a cell of the acoustic panel at a distance from the coupling horn, and move across the acoustic panel through the target cleaning area; and a solvent removal device configured to apply a pressure differential to remove solvent from the acoustic panel.

2. The system according to claim 1, further comprising a control module configured to control at least one of the solvent supply, the ultrasonic generator, movement of the coupling horn, and the solvent removal device.

3. The system according to claim 2, wherein the control module comprises a targeting module configured to identify the target cleaning area of the acoustic panel.

4. The system according to claim 3, wherein the targeting module is configured to identify the target cleaning area using an acoustic impedance test to identify a contaminated region of the acoustic panel.

5. The system according to claim 3, wherein the control module is configured to control at least one of a flow rate or pressure of the solvent from the solvent supply.

6. The system according to claim 1, wherein the coupling horn is configured to transmit the ultrasonic energy to cavitate a portion of the solvent that has penetrated to within a core layer of the acoustic panel.

7. The system according to claim 1, wherein the system is operable to clean the acoustic panel while the panel is on an aircraft.

8. The system according to claim 1, wherein the perforated upper layer comprises at least one aperture having a diameter of approximately one millimeter or less.

9. The system according to claim 1, wherein the solvent removal device is configured to apply at least one of compressed air or suction to the acoustic panel.

10. The system according to claim 1, wherein the solvent comprises methyl n-propyl ketone.

11. The system according to claim 1, wherein the solvent comprises methyl ethyl ketone.

12. A system comprising:
a curved acoustic panel comprising a multi-layer structure that is acoustically active, wherein the acoustic panel comprises a curved upper layer that is perforated;
a solvent supply configured to supply solvent to a target cleaning area of the multi-layer structure, wherein the solvent supply is configured to deliver the solvent through the perforated upper layer of the acoustic panel;
an ultrasonic generator configured to generate ultrasonic energy at a cavitation frequency of the solvent;
a coupling horn coupled to the ultrasonic generator, the coupling horn configured to contact the target cleaning area of the multi-layer structure, cavitate the solvent at a distance from the coupling horn, and move across the multi-layer structure through the target cleaning area;
a solvent removal device configured apply a pressure differential to remove solvent from the multi-layer structure; and
a control module coupled to the coupling horn and configured to control a position of the coupling horn such that the coupling horn contacts the target cleaning area of the multi-layer structure.

13. The system of claim 12, wherein the solvent supply is configured to penetrate solvent into the multi-layer structure.

14. The system of claim 13, wherein the solvent supply is configured to flood the multi-layer structure with the solvent.

15. The system of claim 13, wherein the solvent supply is configured to spray the multi-layer structure with the solvent.

16. The system of claim 12, wherein the control module is configured to control at least one of a flow rate or pressure of the solvent at the solvent supply, a position, activation, or power level of the ultrasonic generator, or the pressure differential applied by solvent removal device.

17. The system of claim 16, wherein the control module comprises a targeting module configured to identify the target cleaning area of the multi-layer structure.

18. A system comprising:
a curved acoustic panel comprising a multi-layer structure that is acoustically active, wherein the acoustic panel comprises a curved upper layer that is perforated;
a solvent supply configured to supply solvent to a target cleaning area of the multi-layer structure, wherein the solvent supply is configured to deliver the solvent through the perforated upper layer of the acoustic panel;
an ultrasonic generator configured to generate ultrasonic energy at a cavitation frequency of the solvent;
a coupling horn coupled to the ultrasonic generator, the coupling horn configured to contact the target cleaning area of the multi-layer structure, cavitate the solvent at a distance from the coupling horn, and move across the multi-layer structure through the target cleaning area;
a solvent removal device configured apply a pressure differential to remove solvent from the multi-layer structure; and
a control module configured to control a position of the coupling horn such that the coupling horn contacts the target cleaning area of the multi-layer structure, the control module comprising a targeting module configured to identify the target cleaning area of the multi-layer structure.

19. The cleaning system of claim 18, wherein the targeting module is configured to identify the target cleaning area using an acoustic impedance test to identify a contaminated region of the multi-layer structure.

* * * * *